(12) United States Patent
Shigeta

(10) Patent No.: US 10,957,156 B2
(45) Date of Patent: Mar. 23, 2021

(54) CHIP MEASUREMENT SYSTEM

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

(*) Notice: Subject to any disclaimer, the term of this patent is extended or adjusted under 35 U.S.C. 154(b) by 0 days.

(21) Appl. No.: 15/700,942

(22) Filed: Sep. 11, 2017

(65) Prior Publication Data
US 2018/0075698 A1 Mar. 15, 2018

(30) Foreign Application Priority Data
Sep. 12, 2016 (JP) ................. 2016-196030

(51) Int. Cl.
| | | |
|---|---|---|
| *G07F 17/32* | (2006.01) | |
| *G01B 11/06* | (2006.01) | |
| *G06T 7/60* | (2017.01) | |
| *G06K 9/00* | (2006.01) | |
| *H04N 7/18* | (2006.01) | |

(52) U.S. Cl.
CPC ...... *G07F 17/3248* (2013.01); *G01B 11/0608* (2013.01); *G06K 9/00* (2013.01); *G06T 7/60* (2013.01); *G07F 17/322* (2013.01); *G07F 17/3209* (2013.01); *G06T 2207/10024* (2013.01); *G06T 2207/30232* (2013.01); *G06T 2207/30242* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 5,651,548 A | 7/1997 | French et al. | |
| 5,781,647 A * | 7/1998 | Fishbine | G07D 9/04 235/375 |

(Continued)

FOREIGN PATENT DOCUMENTS

| | | |
|---|---|---|
| CN | 101853076 A | 10/2010 |
| JP | H05-060559 A | 3/1993 |

(Continued)

OTHER PUBLICATIONS

Written Opinion dated Sep. 11, 2017 for the corresponding Singapore patent application No. 10201606360V.

(Continued)

*Primary Examiner* — Seng H Lim
(74) *Attorney, Agent, or Firm* — Norton Rose Fulbright US LLP

(57) ABSTRACT

In a measurement system according to the present invention, a management control device that measures a total value of chips bet on the game table using an image analysis result obtained by an image recording device is provided. Further, the chip as the gaming chip to be used in this system has a multilayer structure in which a plurality of plastic layers having different colors are laminated including at least a colored layer in the middle thereof, and a white layer or a light color layer (may be a layer having a lighter color than the colored layer although not illustrated) is laminated on both sides of the intermediate colored layer.

22 Claims, 16 Drawing Sheets

(56) References Cited

U.S. PATENT DOCUMENTS

| | | | | |
|---|---|---|---|---|
| 6,186,895 B1* | 2/2001 | Oliver | ............... | A63F 3/00157 463/25 |
| 6,313,871 B1* | 11/2001 | Schubert | ............... | H04N 7/183 348/143 |
| 6,532,297 B1* | 3/2003 | Lindquist | ............... | G07D 9/04 101/493 |
| 7,901,285 B2* | 3/2011 | Tran | ............... | G07F 17/32 463/25 |
| 8,285,034 B2* | 10/2012 | Rajaraman | ............... | G06Q 10/087 382/162 |
| 9,361,577 B2 | 6/2016 | Miyashita | | |
| 9,478,099 B2* | 10/2016 | Czyzewski | ............... | G07F 17/3204 |
| 9,779,582 B1* | 10/2017 | Ben Hanan | ............... | G07F 17/3248 |
| 2002/0042298 A1 | 4/2002 | Soltys et al. | | |
| 2005/0051965 A1* | 3/2005 | Gururajan | ............... | A63F 3/00157 273/292 |
| 2005/0272501 A1* | 12/2005 | Tran | ............... | G07F 17/3241 463/29 |
| 2005/0282622 A1* | 12/2005 | Lindquist | ............... | G07D 9/04 463/25 |
| 2006/0160608 A1* | 7/2006 | Hill | ............... | G07F 17/32 463/25 |
| 2006/0177109 A1* | 8/2006 | Storch | ............... | A63F 1/00 382/118 |
| 2007/0015583 A1* | 1/2007 | Tran | ............... | G07F 17/3288 463/40 |
| 2007/0184898 A1 | 8/2007 | Miller et al. | | |
| 2008/0113783 A1 | 5/2008 | Czyzewski | | |
| 2009/0075725 A1 | 3/2009 | Koyama | | |
| 2009/0131151 A1* | 5/2009 | Harris | ............... | G07F 17/32 463/22 |
| 2009/0233699 A1 | 9/2009 | Koyama | | |
| 2009/0253498 A1* | 10/2009 | Wolf | ............... | G07F 17/32 463/29 |
| 2010/0240446 A1* | 9/2010 | Koyama | ............... | G07F 1/06 463/25 |
| 2011/0052049 A1* | 3/2011 | Rajaraman | ............... | G06T 7/90 382/165 |
| 2012/0231866 A1* | 9/2012 | Witty | ............... | G07F 11/32 463/17 |
| 2012/0252564 A1 | 10/2012 | Moore et al. | | |
| 2013/0316797 A1 | 11/2013 | Gelinotte et al. | | |
| 2014/0291399 A1 | 10/2014 | Koyama | | |
| 2014/0332595 A1* | 11/2014 | Moreno | ............... | G07F 7/02 235/488 |
| 2015/0036920 A1 | 2/2015 | Wu et al. | | |
| 2015/0287206 A1 | 10/2015 | Ebisawa | | |
| 2015/0312517 A1 | 10/2015 | Hoyt et al. | | |
| 2016/0071367 A1* | 3/2016 | Litman | ............... | G07F 17/3232 463/25 |
| 2016/0171336 A1 | 6/2016 | Schwartz | | |
| 2016/0328913 A1* | 11/2016 | Blazevic | ............... | G07F 17/322 |
| 2017/0161987 A1* | 6/2017 | Bulzacki | ............... | G06K 9/3233 |
| 2020/0034629 A1* | 1/2020 | Vo | ............... | A63F 1/04 |

FOREIGN PATENT DOCUMENTS

| | | |
|---|---|---|
| JP | 06-134140 A | 5/1994 |
| JP | H06-134140 A | 5/1994 |
| JP | 2005-144032 A | 6/2005 |
| JP | 2009-066172 A | 4/2009 |
| JP | 2009-219588 A | 10/2009 |
| JP | 2010-128915 A | 6/2010 |
| JP | 2011-106899 A | 6/2011 |
| JP | 2013065809 A1 | 4/2013 |
| JP | 2014-203139 A1 | 10/2014 |
| JP | 2016-110232 A | 6/2016 |
| WO | 2013176265 A1 | 11/2013 |
| WO | 2015-107902 A1 | 7/2015 |
| WO | 2016058085 A1 | 4/2016 |
| WO | 2016/191856 A1 | 12/2016 |

OTHER PUBLICATIONS

International Application No. PCT/JP2017/025796, International Search Report dated Oct. 3, 2017.
International Application No. PCT/JP2017/032692, International Search Report dated Oct. 10, 2017.
Office Action dated Apr. 10, 2018 for the corresponding Australian patent application No. 2017228528.
Examination Report No. 2 dated Dec. 18, 2018 for Family/Corresponding Australian patent application No. 2017228528.
Office Action dated Jul. 10, 2018 for Family/Corresponding Japanese patent application No. 2016-196030.
Office Action dated Aug. 15, 2018 for Family/Corresponding Macau patent application No. I/1529.
Japanese Office Action dated Apr. 2, 2019 for Corresponding Japanese patent application No. 2016-196030.
Japanese Office Action dated Dec. 15, 2020 issued in Japanese patent application No. 2020-008625.

* cited by examiner

CHIP MEASUREMENT SYSTEM

CROSS REFERENCE TO RELATED APPLICATION

The present application claims priority to Japanese Patent Application No. 2016-196030 filed Sep. 12, 2016, the entire contents of which are hereby incorporated by reference.

FIELD OF THE INVENTION

The present invention relates to a measurement system of chips which are gaming chips in a game hall.

BACKGROUND

A technique of attaching a radio IC (RFID) tag to each of gaming chips and grasping a value of the gaming chip has been proposed in order to grasp the number and the total value of gaming chips placed and bet on a game table.

In a card game monitoring system described in WO 2015/107902 A, whether gaming chips placed on a game table has been collected or redeemed according to a win or lose result is determined by performing image analysis of motion of the gaming chips, and monitoring of fraudulent act is performed.

In addition, a technique of attaching an IC tag to a chip of a gaming chip and grasping a value of the chip as the gaming chip has been proposed in order to grasp the number and the total value of the chips as the bet gaming chips in a game hall such as a casino.

Chips as gaming chips are stacked in bulk and placed on a game table, but there is a problem that it is difficult to accurately read the total value because the chips overlap each other in the related art in which an IC tag is mounted in each of the chips and the stacked chips is read by a reading device of the IC tag provided under the game table. Further, there is a problem that chips as gaming chips placed at different positions (win or lose depends on positions) are collectively measured if the sensitivity of the reading device is increased so that it is difficult to grasp the total value of chips as gaming chips for each position. In addition, there is a problem that a blind spot is formed depending on a viewing angle of a camera or it is difficult to grasp the total value of chips as gaming chips due to a shadow caused by the overlap in imaging using the camera.

In a game hall such as a casino, chips as gaming chips are stacked in bulk and placed on a game table in a game hall such as a casino, but there is a problem that it is difficult to accurately read the total value with a reading device of an IC tag provided under the game table. Further, there is a problem that chips as gaming chips placed at different positions (win or lose depends on positions) are collectively measured if the sensitivity of the reading device is increased so that it is difficult to grasp the total value of chips as gaming chips for each position.

An object of the present invention is to provide a novel system to measure the total value of stacked chips in a game in a game hall.

SUMMARY

In order to solve the above-described problem, a chip measurement system according to the present invention includes: an image recording device that records states of chips to be measured, which are stacked with a predetermined thickness in a game played on a game table, as an image using a camera; a plurality of height measurement cameras that obtain images of the stacked chips to be measured from different positions or angles; a chip number measuring device that obtains a height of the chips to be measured from each viewing angle toward the chips to be measured with respect to a horizontal or vertical direction, obtained from the plurality of height measurement cameras, using the plurality of height measurement cameras and calculates and obtains a number of the chips to be measured; and a management control device that controls the image recording device and the chip number measuring device.

Further, the chip measurement system may further include: a chip total value measuring device that calculates and obtains a total value of the stacked chips to be measured from the number of the chips to be measured obtained from the chip number measuring device; and a management control device that controls the chip total value measuring device in addition to the image recording device and the chip number measuring device.

The chip measurement system may further include a chip total value measuring device that calculates and obtains a total value of the stacked chips to be measured by identifying a type of each of the chips from an image analysis result of the image recording device.

In addition, this chip measurement system may be configured such that the management control device is capable of grasping a position, a type, and a number of chips to be measured bet by each player using the image recording device and grasping a total value of all the chips bet by the respective players. In addition, the chip measurement system may further include: a chip tray camera that obtains an image of a chip tray of a dealer of the game table; and a chip measuring device that grasps a total value of chips in the chip tray from the image obtained by the chip tray camera.

The present invention relates to the chip measurement system further including a win or lose result determination device that obtains a win or lose result of each game on the game table. It may be configured such that the management control device is capable of grasping a total value of chips bet by a losing player in the game from a position, a type and a number of the chips bet by the losing player based on information obtained by the win or lose result determination device.

Further, the management control device may grasp the total value of the chips to be measured in the chip tray of the dealer of the game table, add or subtract an increased or decreased value of chips to be measured in the game, calculated based on the positions, types, and each number of chips to be measured bet by all the players in the game and the win or lose result of the game obtained by the win or lose result determination device to or from the total value of the chips to be measured in the chip tray as a measurement target before settlement of each game, compare a total value of chips to be measured that needs to be present in the chip tray as the measurement target after settlement when ending the game with an actual total value of chips to be measured in the chip tray as the measurement target when ending the game obtained using the image recording device, and determine whether or not there is a difference between the total value that needs to be present and the actual total value.

Further, the chip measurement system may be configured such that a plurality of the image recording devices are provided, and the chip total value measuring device calculates the total value of chips to be measured using images of the stacked chips to be measured which are taken from different positions or angles of the respective image recording devices.

In addition, the chips to be measured in this chip measurement system may have a configuration in which a laminated structural body including a plurality of plastic layers is configured by laminating at least a colored layer and a white layer or a light color layer and a stripe pattern in a laminating direction is formed on a side face so as to enable a type of a gaming chip to be specified by the colored layer, and have a layer structure obtained by forming a printed layer indicating a type of a gaming chip further on upper and lower faces of the laminated structural body and causing thermocompression bonding between the respective layers.

Further, in order to solve the above-described problem, a chip measurement system according to the present invention includes: an image recording device that records states of chips to be measured, which are stacked with a predetermined thickness in a game played on a game table, as an image using a camera; a plurality of height measurement cameras that obtain images of the stacked chips to be measured from different positions or angles; a chip number measuring device that obtains a height of the chips to be measured from each viewing angle toward the chips to be measured with respect to a horizontal or vertical direction, obtained from the plurality of height measurement cameras, using the plurality of height measurement cameras and calculates and obtains a number of the chips to be measured; a chip total value measuring device that calculates and obtains a total value of the stacked chips to be measured based on the number of the chips to be measured obtained by the chip number measuring device and an image analysis result of the image recording device; and a management control device that controls the image recording device, the chip number measuring device, and the chip total value measuring device. The chip to be measured has a configuration in which a laminated structural body including a plurality of plastic layers is configured by laminating at least a colored layer and a white layer or a light color layer and a stripe pattern in a laminating direction is formed on a side face so as to enable a type of a gaming chip to be specified by the colored layer, and has a layer structure obtained by forming a printed layer indicating a type of a gaming chip further on upper and lower faces of the laminated structural body and causing thermocompression bonding between the respective layers.

In addition, the chip to be measured may have a heavy layer containing metal powder for weight increase in the layer as at least one layer among the plurality of plastics layers. In addition, the chip to be measured may be configured such that a white layer or a light color layer is provided on both sides of the colored layer to be sandwiched therebetween such that thicknesses of an upper layer and a lower layer of the white layer or the light color layer provided to sandwich the colored layer are different from each other.

According to the measurement system of the present invention, it is understood whether or not collection and redemption of chips has been correctly performed according to a win or lose result of a game by measuring the number of chips placed in the stacked state and calculating a total value of bet chips.

The foregoing and other objects, features, aspects and advantages of the exemplary embodiments will become more apparent from the following detailed description of the exemplary embodiments when taken in conjunction with the accompanying drawings.

DETAILED DESCRIPTION EMBODIMENTS

In a game hall such as a casino, chips as gaming chips are stacked in bulk and placed on a game table in a game hall such as a casino, but there is a problem that it is difficult to accurately read the total value with a reading device of an IC tag provided under the game table. Further, there is a problem that chips as gaming chips placed at different positions (win or lose depends on positions) are collectively measured if the sensitivity of the reading device is increased so that it is difficult to grasp the total value of chips as gaming chips for each position.

Figure 2:
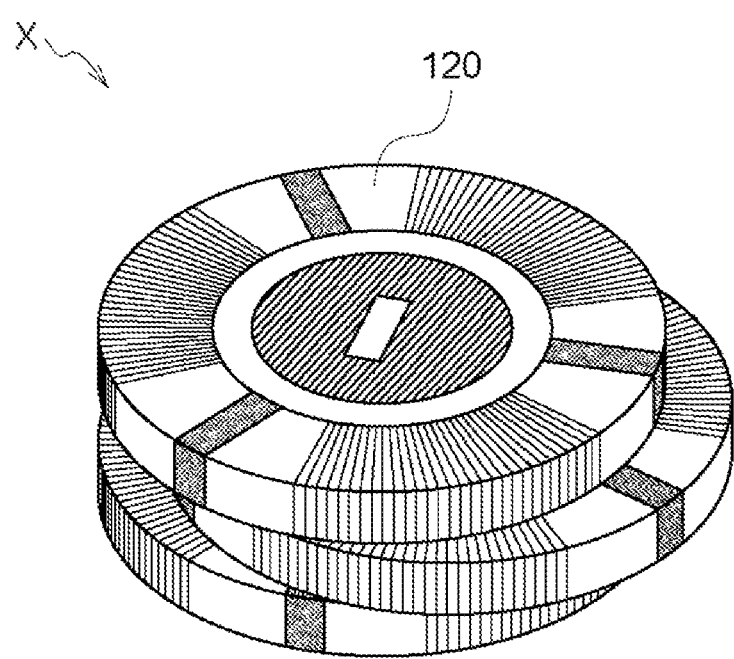
FIG. 2 is a perspective view of chips as gaming chips illustrating an example of different overlapping states of the chips as the gaming chips grasped according to the first embodiment of the present invention.

In addition, conventionally, a pattern of a chip 120 as a gaming chip is complicated as illustrated in FIG. 2, and there is a problem that it is difficult to accurately grasp the number of stacked chips using a camera if a large number of chips as gaming chips are stacked.

The chips 120 as the gaming chips are not only stacked to be aligned in the vertical direction but also stacked to be shifted from each other as illustrated in FIG. 2. In this case, when the camera device 2 is positioned in an arrow X direction illustrated in FIG. 2 (or the orientation of the chip 120 as the gaming chip becomes relatively a blind spot), it is assumed that the chip 120 as the gaming chip is invisible (enters the blind spot).

In addition, a dealer needs to collect or redeem the chips 120 as the gaming chips placed on the game table according to a win or lose result. Even if it is attempted to determine this by performing image analysis of the chips 120 as the gaming chips, it is difficult to determine whether or not the dealer has correctly redeemed the chips 120 as the gaming chips corresponding to the chips 120 as the gaming chips that have been bet at the time of redemption with an existing practical image analysis technology because the pattern of the chip 120 as the gaming chip is complicated, and there is a problem that it is insufficient to prevent a mistake.

According to a system according to the present embodiment, it is possible to determine the number of the chips 120 as the gaming chips by image analysis even if a large number of the chips 120 as the gaming chips are stacked, and it is possible to grasp the total value of the chips 120 as the gaming chips that relatively overlap each other by positions and colors.

Figure 1:
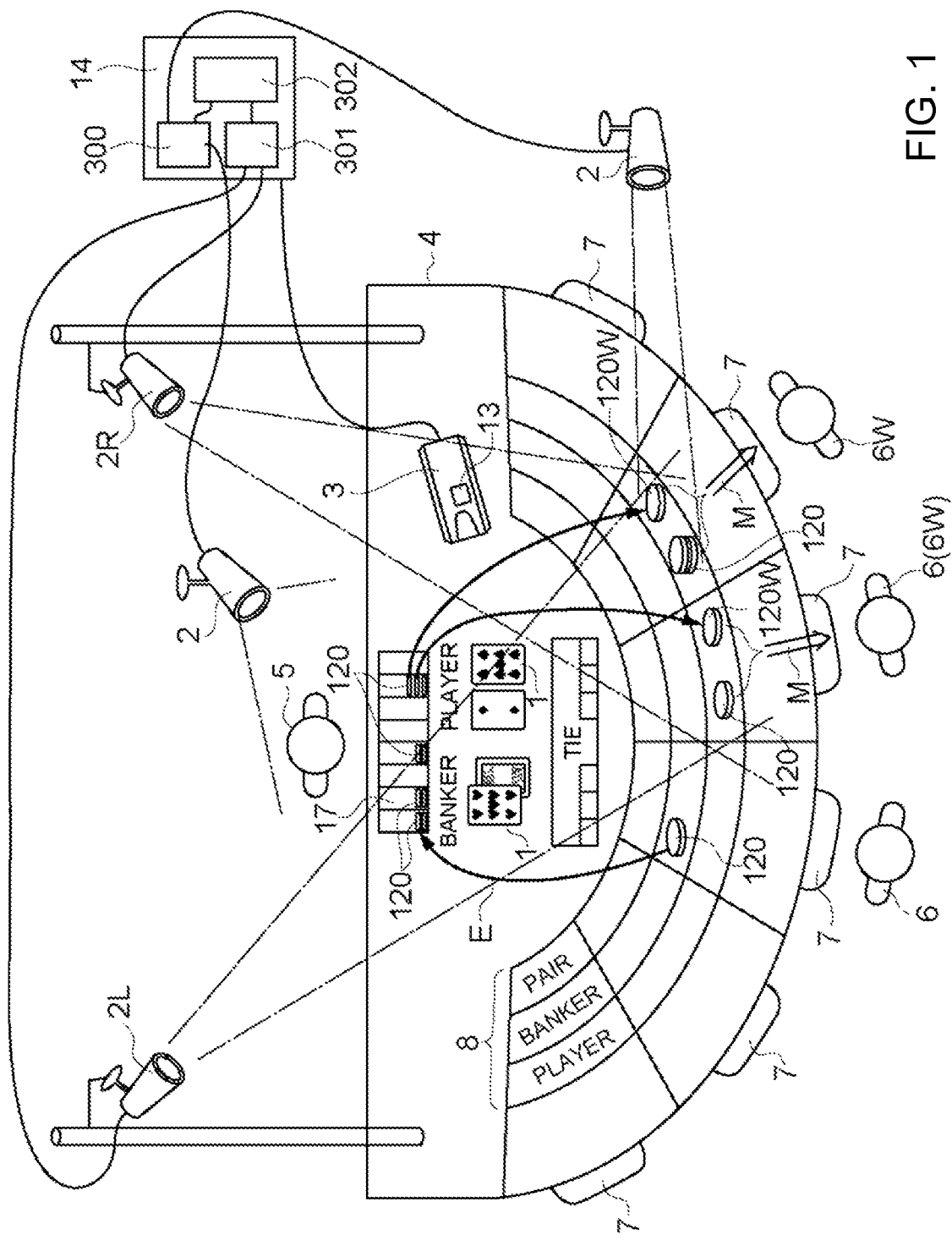
FIG. 1 is a view illustrating an overall outline of a measurement system of chips as gaming chips according to a first embodiment of the present invention.

Hereinafter, a chip measurement system in a table game in a game hall including a game table 4 according to an embodiment of the present invention will be described with reference to the drawings. FIG. 1 is a view illustrating an overall outline of the system, and the system according to the present embodiment in the game hall including a plurality of the game tables 4 includes: a chip total value measuring device 302 including an image recording device 300 that records a progress state of the game performed on the game table 4 in addition to a game participant 6 and a dealer 5, as an image using a plurality of the camera devices 2, and performs image analysis of the recorded image of the progress state of the game; and a card distributing device 3 that determines and displays a win or lose result of each game on the game table 4. The card distributing device 3 is a so-called electronic shoe, which has been already known and used by those skilled in the art, and has a structure in which a game rule is programmed in advance, and it is possible to determine win or lose of a game by reading information (a rank and a suit) of a card 1 to be distributed. In a baccarat game, for example, bunker's win, player's win, or a tie is basically determined by each rank of two to three cards, and a determination result (win or lose result) is displayed using a display lamp 13.

A management control device 14 reads the information (rank and suit) of the card 1 obtained from the card distributing device 3 to determine the win or lose result of each game, and determines a winner 6W and a loser 6L among the participants 6 in each game using measurement results of the position, type, and number of the chips 120 as the gaming chips placed by the game participants 6. In addition, a calculation function of performing balance calculation on the casino side in the game table 4 (obtaining the value by subtracting the total value of the chips 120 as the gaming chips redeemed to the winner 6W among the participants 6 from the total value of the chips 120 as the gaming chips bet by the loser 6L) for each game is further provided.

The image recording device 300, the chip total value measuring device 302, and the management control device 14 in this measurement system have a structure including a computer, a program, and a memory, which are integrated or have of a plurality of configurations, in a complex manner.

Figure 3:
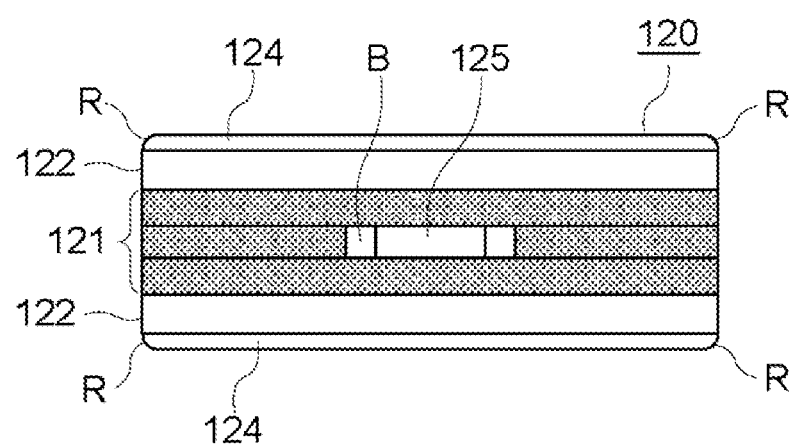
FIG. 3 is a side cross-sectional view of the chip as the gaming chip according to the first embodiment of the present invention.
Figure 6:
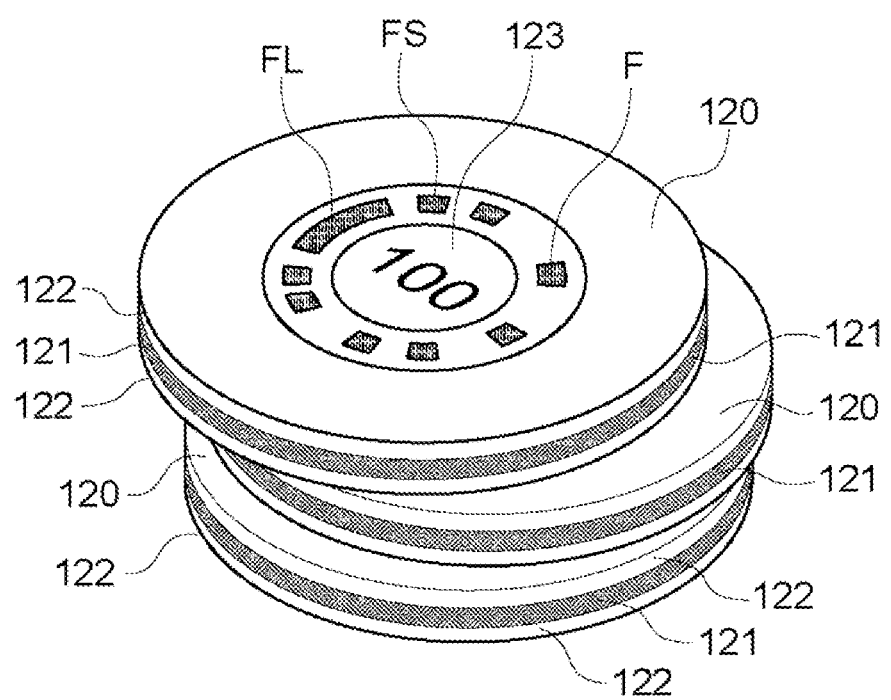
FIG. 6 is a perspective view of a state where the chips as the gaming chips are stacked up according to the first embodiment of the present invention.

Next, details of the chip as the gaming chip used for this measurement will be described. FIG. 3 is a front cross-sectional view of the chips 120 as the gaming chips used in this measurement system. A plurality of plastic layers having different colors are laminated such that at least a colored layer 121 is provided in the middle thereof, and a white layer 122 or a light color layer (which may be a layer having a lighter color than the colored layer 121 although not illustrated) is laminated on both sides of the intermediate colored layer 121, thereby forming a multilayer structure. In this manner, the multilayer structure is formed by providing the colored layer 121 and laminating the white layer 122 or the light color layer (which may be a layer having a lighter color than the colored layer 121 although not illustrated) on both the sides of the intermediate colored layer 121 so as to form a stripe pattern in a laminating direction on a side face as illustrated in FIG. 6 so that it is possible to specify a type of the chip 120 as the gaming chip by changing colors (red, green, yellow, blue, and the like) of the colored layer 121 depending on types (10 points, 20 points, 100 points, 1000 points, and the like) of the chips 120 as the gaming chips.

Figure 4A:
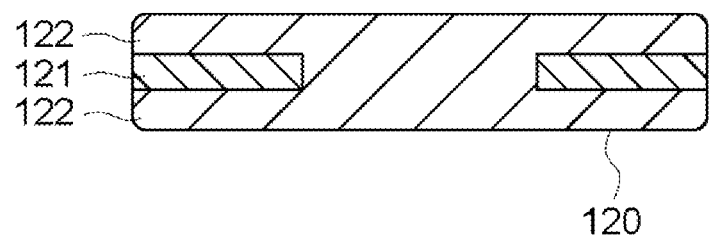
FIG. 4A is a view illustrating another example of the chip as the gaming chip according to the first embodiment of the present invention.
Figure 4B:
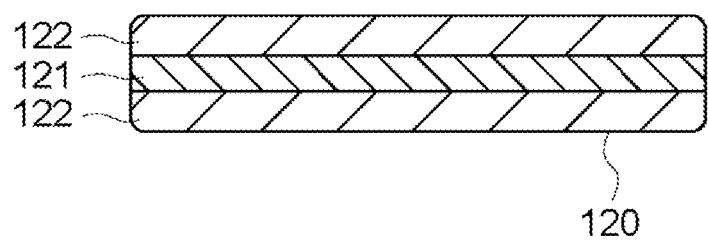
FIG. 4B is a view illustrating another example of the chip as the gaming chip according to the first embodiment of the present invention.

The chip 120 as the gaming chip is formed as a structural body including at least the colored layer 121 and the white layer 122 or the light color layer in appearance so as to form the stripe pattern in an axial direction on the side face and has a configuration capable of specifying the type of the chips 120 as the gaming chip through the colored layer 121. FIGS. 4A and 4B illustrate examples as different embodiments, respectively, in which the colored layer 121 and the white layer 122 or the light color layer are formed by injection molding using so-called two-color molding in which the colored layer 121 is first molded in a molding die (not illustrated), and then, the white layer 122 or the light color layer is molded.

Figure 5:
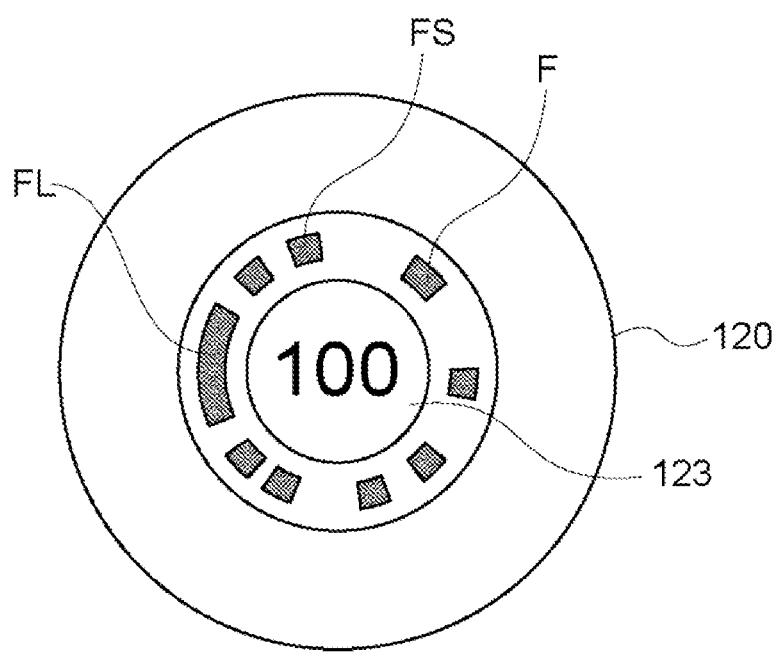
FIG. 5 is a plan view of the chip as the gaming chip according to the first embodiment of the present invention.

Further, a print 123 (100 points or the like) indicating the type of the chip 120 as the gaming chip is applied on surfaces (an upper surface and a lower surface) of the white layer 122 in the chip 120 as the gaming chip as illustrated in FIG. 5. As illustrated in FIG. 3, a transparent layer 124 is provided at the outermost layer, and thermocompression bonding is performed between the respective layers to form a structure including at least five layers. The chip 120 as the gaming chip is formed using an elongated plastic material by forming the state (five-layer structure or the like) in which the respective layers (the colored layer 121, the white layer 122, and the transparent layer 124) are thermocompression-bonded and in close contact with each other in the elongated state, and then, punching the resultant in a circular shape, a rectangular shape, or the like using a press or the like. An end of the transparent layer 124 at the outermost layer is subjected to R processing (to form a rounded corner) by designing dimensions of the molding die and a punch for punching at the time of performing punching using the press.

That is, when the chip 120 is manufactured as the gaming chip, the laminated structural body including the plurality of plastic layers is formed by first laminating the colored layer 121 made of plate-like plastic and the white layer 122 or the light color layer made of plate-shaped plastic. Then, a pattern is printed on the upper surface and the lower surface of the laminated structural body, and the transparent layer 124 is further provided thereon. Then, the respective layers of the laminated structural body and the transparent layer 124 are thermocompression-bonded to thermally weld the respective layers, preparing a substitute currency original plate. The substitute currency original plate prepared in this manner is subjected to the punching processing using the die to obtain the plurality of chips 120 as the gaming chips having a predetermined shape. At this punching processing, upper and lower corners at the outer side of the chip 120 as the gaming chip are subjected to the R processing with the die.

Further, a face code is provided on a surface of the white layer 122 using a UV ink or a carbon black ink in the chip 120 as the gaming chip (see FIG. 5). This face code indicates the authenticity of the chip 120 as the gaming chip, and is configured such that a mark is visible when being shined with ultraviolet (or infrared) light to indicate the authenticity using a combination of a shape and the number thereof. FIG. 6 is a perspective view of a stacked state of the chips 120 as the gaming chips, and a combination of a long code FL and a short code FS is a face code F. The transparent layer (printed layer) 124 is thermocompression-bonded or coated (applied) on the outermost layer so as to cover the print 123 and the face code, and the transparent layer 124 is subjected to emboss processing so as to prevent the chips 120 as the gaming chips from being brought into close contact with each other. Incidentally, the description has been given with the example in which the face code is printed on the surface of the white layer 122 in this embodiment, but any one of a security mark and an optical variable device (OVD), or the both may be printed instead of the face code or together with the face code.

The edge of the outermost transparent layer (printed layer) 124 to which the print 123 (100 points or the like) is applied is subjected to the R processing (R) so as to prevent the surface of the white layer 122 from being deformed and appearing on the side surface in the punching step of the chip 120 as the gaming chip. In addition, the chip 120 as the gaming chip is prevented from damaging a hand or the other chip 120 as the gaming chip due to the remaining sharp edge.

As illustrated in FIG. 3, the colored layer 121 may be formed of a plurality of colored layers (three layers in FIG. 3). Since the plurality of colored layers (three layers in FIG. 3) are thermocompression-bonded to each other, the three-layer structure is not visually observable as illustrated in FIG. 3, and FIG. 3 illustrates the three layers for the sake of description. Further, a partial hollow B is provided in the middle layer among the three layers of the colored layer 121, and an RFID 125 is incorporated therein.

Incidentally, the RFID 125 may be incorporated in the chip 120 as the gaming chip by arranging the RFID 125 between the colored layer 121 having a flat surface and the white layer 122 having a flat surface and thermocompression-bonding the colored layer 121 and the white layer 122 without providing the hollow B in the colored layer 121. When at least any one of the colored layer 121 and the white layer 122 is configured using a thermally deformable material such as plastic, the plastic layer of the colored layer 121 and the white layer 122 sandwiching the RFID 125 is thermally deformed by the thermocompression bonding, and thus, the RFID 125 is brought into close contact with these layers and fixed therebetween without providing the hollow B.

Figure 7:
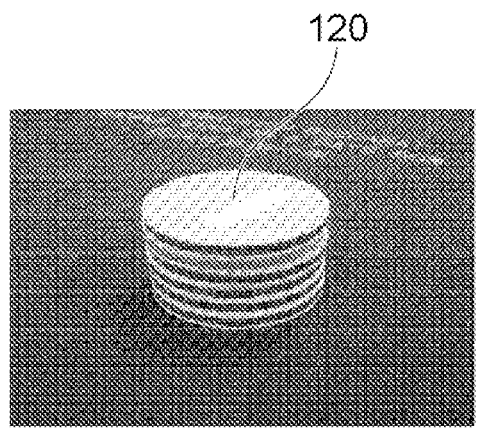
FIG. 7 is a perspective explanatory photograph illustrating a state where different types of chips as gaming chips are stacked up.

FIG. 7 is a perspective explanatory photograph illustrating a state where different types of chips 120 as gaming chips are stacked up. In the drawing, the management control device 14 images the chips 120 as the gaming chips placed on the game table 4 by the participant 6 of the game using the camera device 2, and determines the types and the number of the chips 120 as the gaming chips by measuring whether a chip is bet on a banker, a player, a pair (PAIR), or a tie (TIE)) for each area 8 where the chip is placed using the chip total value measuring device 302 provided with the image recording device 300 and analyzing and measuring the number and colors of the colored layer 121 (or the light color layer) or the white layer 122 of the chips 120 as the gaming chips stacked in each area using the chip total value measuring device 302 (using the information obtained by the image recording device 300). The management control device 14 controls the camera device 2 such that the imaging by the camera device 2 is performed when a first card is drawn from the card distributing device, before or after the first card is drawn, or after a sign indicating a betting end of the dealer.

The management control device 14 may be a control device having an artificial intelligence utilization type or a deep learning structure. The management control device 14 can grasp a position 8 (betting position among the player, the banker, and the pair), the type (different values of the value are assigned to the respective colors of the chips 120 as the gaming chips), and the number of the chips 120 as the gaming chips bet by each of the participant 6 using the camera device 2 and the image recording device 300. In the artificial intelligence utilization type computer or control system, and the deep learning (structure) technology, it is possible to grasp the position 8 (betting position among the player, the banker, and the pair), the type (different values of the value are assigned to the respective colors of the chips 120 as the gaming chips), and the number of the chips 120 as the gaming chips using a self-learning function and the like. Thus, the management control device 14 determines whether the collection (indicated by an arrow E) of the chips 120 as the gaming chips bet by the losing participant 6L of each game and the redemption (payment (120W)) for the chips 120 as winning gaming chips to the winning game participant 6W have been appropriately performed according to a win or lose result of the game by analyzing a video of a progress state of the game using the image recording device 300 according to the win or lose result of the game determined by the card distributing device 3 in each game.

In this case, the chip has the multilayer structure laminated as illustrated in FIG. 6 (as compared with the chip as the conventional gaming chip illustrated in FIG. 2) and has the stripe pattern in the laminated direction clearly formed on the side face, and thus, the chip total value measuring device 302 including the image recording device 300 can easily and accurately perform the measurement of the type and the number of the chips as the gaming chips. Further, the analysis and determination of the image can be more accurately performed using the artificial intelligence utilization type computer or control system and the deep learning (structure) technology. Since the artificial intelligence utilization type computer or control system and the deep learning (structure) technology have been already known and available to those skilled in the art, the detailed description thereof will be omitted.

The management control device 14 can analyze and grasp the total value of the chips 120 as the gaming chips in a chip tray 17 of the dealer 5 of the game table 4 using the image recording device 300 and can perform comparative calculation on whether the total value of the chips 120 as the gaming chips inside the chip tray 17 has increased or decreased according to the win or lose result of the game based on the value of the collection of the chips 120 as the losing gaming chips bet by the respective game participants 6 and the payment 120W for the chips as the winning gaming chips to the winning game participant 6W after the end and settlement of the game. Although the total amount of the chips 120 as the gaming chips in the chip tray 17 is constantly grasped using the means such as the RFID, whether or not the increased or decreased amount is correct is determined by the management control device 14 analyzing the video of the progress state of the game with the image recording device 300. The artificial intelligence utilization type or the deep learning structure may be utilized for the management control device 14.

The management control device 14 may have the artificial intelligence utilization type or the deep learning structure that can grasp a position (betting position among the player, the banker, and the pair) and the value (the type and the number) of the chips as the gaming chips bet in the respective play positions 7 of the game table 4, compare win or lose history of each of the game participants 6 and the value (winning value) of the chips as the gaming chips, obtained using the win or lose result of each game, with statistical data of past multiple games (big data), and extract a specific situation (set by the casino). Typically, the management control device 14 having the artificial intelligence utilization type or the deep learning structure that is capable of extracting generation of a winning value exceeding a certain value (one million dollars) and a situation in which a state where the value of chips as gaming chips bet at the time of lose is small and the value of chips as gaming chips bet at the time of win continues for several games in the play position 7 of the certain game table 4 as the unique situation when being compared with the statistical data of past games (big data and the like).

The management control device 14 has the structure capable of the comparative calculation on whether or not an increase or decrease of chips as gaming chips corresponding to settlement is correct after the settlement by settling the chips 120 as the gaming chips bet by the respective participants 6 after each game in the total value of the chips 120 as the gaming chips in the chip tray 17 of the dealer 5 of the game table 4.

It is possible to determine the type and the number of the chips 120 as the gaming chips by the chip total value measuring device 302 analyzing and measuring the number and colors of the colored layer 121 or the white layer 122 of the chips 120 as the gaming chips laminated in the lateral direction (using the information obtained by the image recording device 300) in the chip tray 17 for holding the chip 120 as the gaming chip of the dealer 5 illustrated in FIG. 1. In this manner, the total value of the chips 120 as the gaming chips of the holding chip tray 17 is constantly grasped (or at predetermined time intervals). The management control device 14 has the function of calculating the settlement value of each game for each game (balance calculation on the casino side in the game table 4 (the value obtained by subtracting the total value of the chips 120 as the gaming chips redeemed to the winner 6W among the participants 6 from the total value of the chips 120 as the gaming chips bet by the loser 6L) (see the above description), and thus, the total value of the chips 120 as the gaming chips of the chip tray 17 is constantly verified (or at predetermined time intervals). That is, it is verified whether or not the increase or decrease of chips as gaming chips matches the image analysis result by the image recording device 300 and the settlement value of each game by the dealer 5.

Figure 8A:
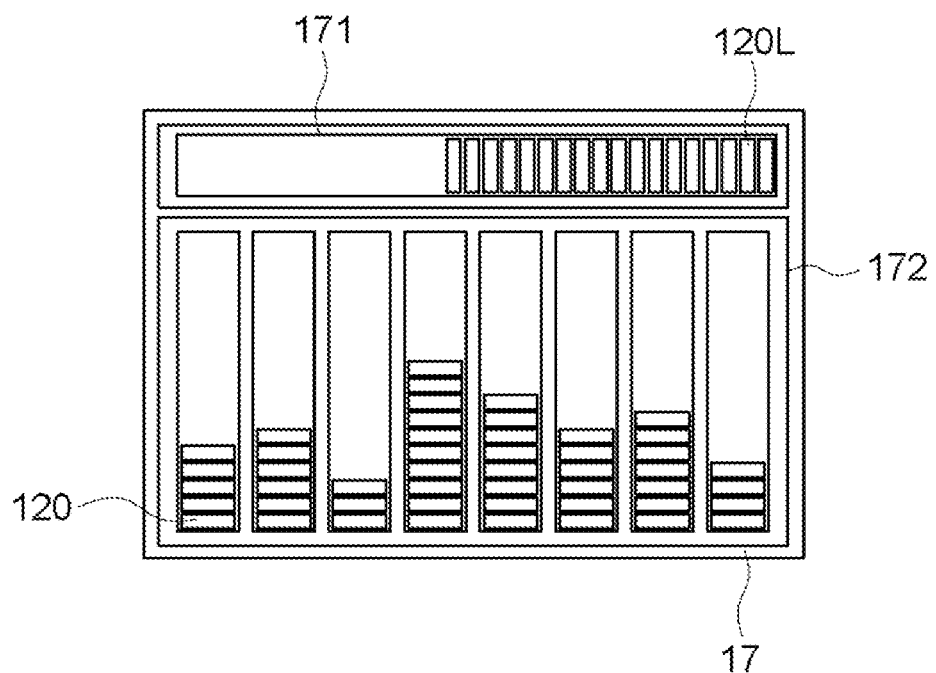
FIG. 8A is a view illustrating details of a chip tray according to the first embodiment of the present invention.
Figure 8B:
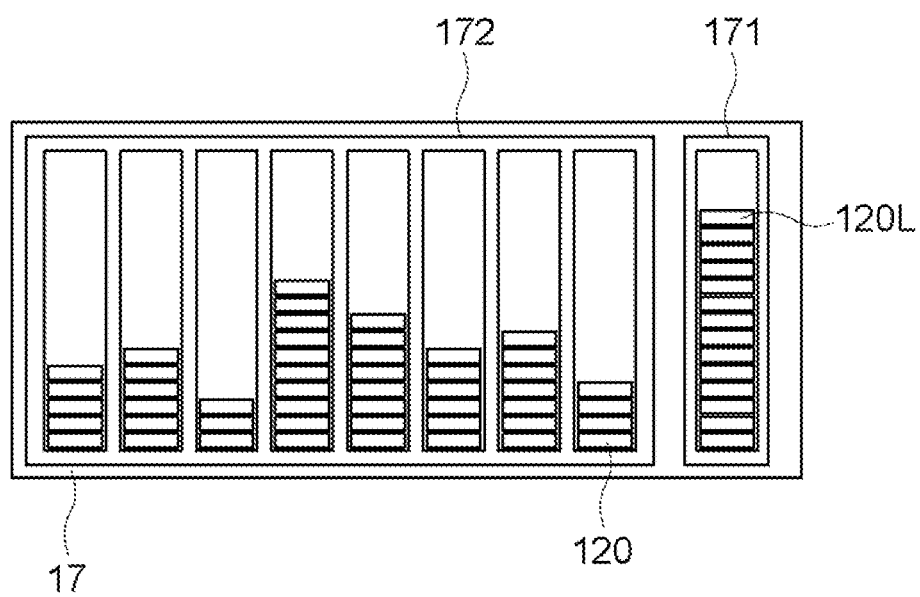
FIG. 8B is a view illustrating another example of the chip tray according to the first embodiment of the present invention.

FIG. 8A is a view illustrating details of the chip tray according to the present embodiment, and FIG. 8B is a view illustrating another example of the chip tray. The chip tray 17 is provided with a collection chip tray 171 to collect and temporarily store a chip 120L as a gaming chip bet by the losing player 6L and a redemption chip tray 172 to store a chip 120W as a gaming chip for redemption. The image recording device 300 and the management control device 14 grasp the positions, types and number of the chips 120L as the gaming chip bet by the losing player 6L, and calculates an increased value of the chips 120L as the gaming chips in the game (the value of the chips 120 as the gaming chips that needs be present in the collection chip tray 171). Further, the image recording device 300 and the management control device 14 grasp an actual total value of the chips 120 as the gaming chips in the chip tray 171 after collection, and determines whether or not there is a difference by comparing the total value that needs to be present and with the actual total value.

Figure 9A:
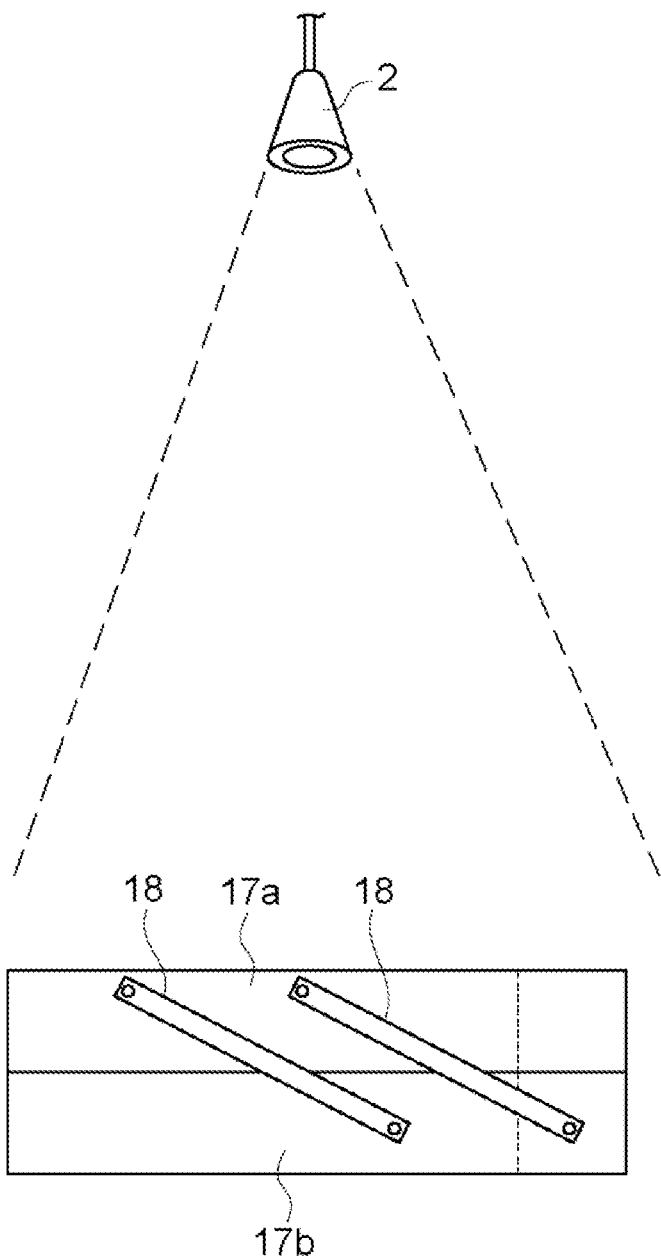
FIG. 9A is a view illustrating a relationship between a chip tray having a two-stage structure and a camera device and is the view illustrating a state where the two stages are stacked on each other.
Figure 9B:
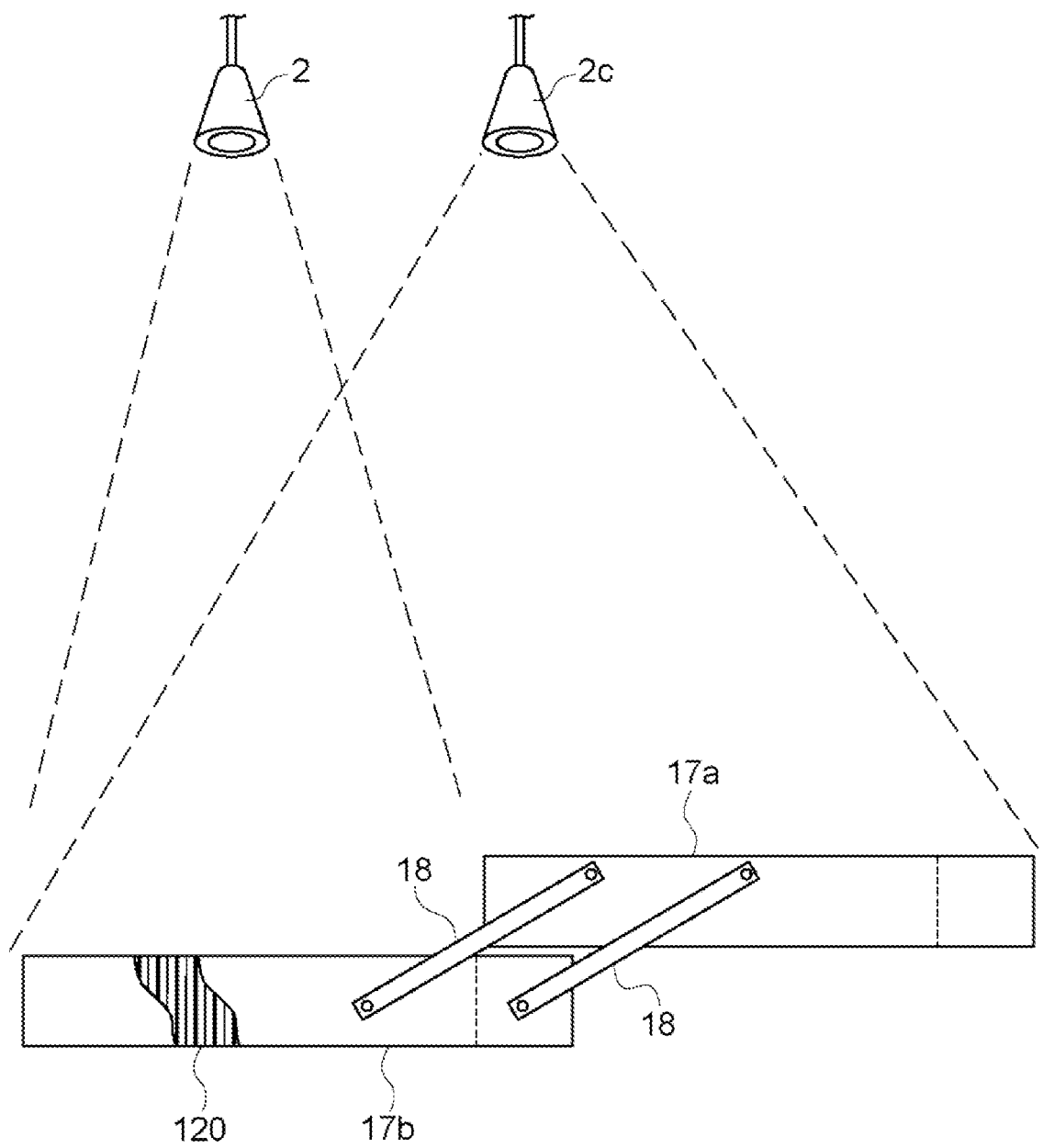
FIG. 9B is a view illustrating a relationship between the chip tray having the two-stage structure and the camera device and is the view illustrating a state where the two stages are shifted from each other.

Here, the chip tray 17 illustrated above has a two-stage structure including an upper chip tray 17a and a lower chip tray 17b. FIGS. 9A and 9B are views illustrating a relationship between the two-stage chip tray 17 and the camera device 2, FIG. 9A illustrates a state where two stages are stacked on each other, and FIG. 9B illustrates a state where two stages are shifted from each other. The lower chip tray 17b is located at the lower stage of the upper chip tray 17a, and the both are connected to each other by a hinge 18. The chips 120 as the gaming chips are replenished from the lower chip tray 17b to the upper chip tray 17a when the chips 120 as the gaming chips of the upper chip tray 17a are insufficient, and the chips 120 as the gaming chips are moved to the lower chip tray 17b when the chips 120 as the gaming chips of the upper chip tray 17a becomes excessive.

The upper chip tray 17a is moved by the hinge 18 to the state of FIG. 9B in order to take the chips 120 as the gaming chips in and out of the lower chip tray 17b. The upper chip tray 17a can be imaged by the camera device 2 in the state of FIG. 9A, and the lower chip tray 17b can be imaged by the camera device 2 in the state of FIG. 9B. In the state illustrated in FIG. 9B, the upper chip tray 17a and the lower chip tray 17b can be imaged at the same time and in the state of being distinguishable from each other by the camera device 2c. In addition, the upper chip tray 17a and the lower chip tray 17b may be captured separately in the state of FIG. 9B.

The management control device 14 can grasp which position (betting position among the player, the banker, and the pair) in the bet area 8 at which the chips 120 as the gaming chips are bet by the respective players 6, the types (different values of the value are assigned to the respective colors of the chips 120 as the gaming chips) of the chips 120 as the bet gaming chips, and the number thereof using the camera device 2 and the image recording device 300. The chips 120 as the gaming chips are not only stacked to be aligned in the vertical direction but also stacked to be shifted from each other as illustrated in FIG. 2. In this case, when the camera device 2 is positioned in the arrow X direction illustrated in FIG. 2 (or when the orientation of the chip 120 as the gaming chip becomes relatively the blind spot), it is assumed that the chip 120 as the gaming chip is invisible (enters the blind spot).

In this manner, it is necessary to grasp which position (betting position among the player, the banker, and the pair) in the bet area 8 at which the chips 120 as the gaming chips are bet, the types (different values of the value are assigned to the respective colors of the chips 120 as the gaming chips) of the chips 120 as the bet gaming chips, and the number thereof.

Further, the management control device 14 determines whether or the collection (indicated by the arrow E) of the chips 120 as the losing gaming chips bet by the respective participants 6 and the payment (120W) for the chips 120 as the winning gaming chips to the winning game participant 6W have been appropriately performed according to the win or lose result of the game by analyzing the video of the progress state of the game using the image recording device 300 according to the win or lose result of the game determined by the card distributing device 3 in each game. When a determination result analyzed by the management control device 14 using the image recording device 300 is different from a reading result (for example, a reading result using the RFID) using another means, the verification can be performed after saving the analysis image.

The management control device 14 can analyze and grasp the total value of the chips 120 as the gaming chips in a chip tray 17 of the dealer 5 of the game table 4 using the image recording device 300 and can perform comparative calculation on whether the total value of the chips 120 as the gaming chips inside the chip tray 17 has increased or decreased according to the win or lose result of the game based on the value of the collection of the chips 120 as the losing gaming chips bet by the respective players 6 and the payment 120W for the chips as the winning gaming chips to the winning player 6W after the end and settlement of the game. Although the total value of the chips 120 as the gaming chips in the chip tray 17 is constantly grasped using the means such as the RFID, whether or not the increased or decreased value is correct is determined by the management control device 14 analyzing the video of the progress state of the game with the image recording device 300.

In this example, the fraud and mistake are detected based on the win or lose result of the game, the information on which number and which type of the chips 120 as the gaming chips are bet at which position (the player, the banker, or the pair) in the bet area 8, and the increased or decreased amount of the chips 120 as the gaming chips in the chip tray 17 after the end of collection of chips as losing gaming chips and redemption for the chips 120 as winning gaming chips. Thus, it is possible to detect the fraud and mistake without grasping movement of the chip 120 as the gaming chips after the game is over, that is, whether the bet chips 120 as the gaming chips have moved to the player side or the dealer side.

Here, in the case of baccarat, for example, the win or lose result of the game can be determined according to rules of the baccarat by reading a rank of the card 1 fed out in the game in the card distributing device 3. In addition, the win or lose result of the game can be determined by capturing an image of the top of the game table 4 using the camera device 2, analyzing the image using the image recording device 300, and comparing the analysis result with rules of the game using the management control device 14. In this case, a win or lose result determination device of the present invention is configured by the camera device 2, the image recording device 300, and the management control device 14.

The information on the players at the respective play positions 7 and on which number and which type of the chips 120 as the gaming chips are bet at which position (the player, the banker, or the pair) in the bet area 8 is obtained by capturing an image of the chips 120 as the gaming chips placed in the bet area 8 using the camera device 2 and analyzing the image for each of the play positions 7 using the image recording device 300. Details will be described later.

In addition, it is possible to calculate the increased or decreased value of the chips 120 as the gaming chips in the chip tray 17 before and after performing the collection of the chips 120 as the losing gaming chips and the redemption of the chips 120 as the winning gaming chips by comparing the total value of the chips 120 as the gaming chips in the chip tray 17 before performing the collection of the chips 120 as the losing gaming chips and the redemption for the chips 120 as the winning gaming chips with the total value of the chips 120 as the gaming chips in the chip tray 17 after performing the collection of the chips 120 as the losing gaming chips and the redemption for the chips 120 as the winning gaming chips. It is possible to detect each of the total value of the chips 120 as the gaming chips in the chip tray 17 before performing the collection of the chips 120 as the losing gaming chips and the redemption for the chips 120 as the winning gaming chips and the total value of the chips 120 as the gaming chips in the chip tray 17 after performing the collection of the chips 120 as the losing gaming chips and the redemption for the chips 120 as the winning gaming chips by capturing an image of the chip tray 17 housing the chips 120 as the gaming chips using the camera device 2, and analyze the image using the image recording device 300. In addition, the total value of the chips 120 as the gaming chips housed in the chip tray 17 may be detected by embedding the RFID indicating the value in the chip 120 as the gaming chip and providing the RFID reader in the chip tray 17.

For example, the total value of the chips 120 as the gaming chips in the chip tray 17 before start of a game is assumed as Bb, and the total value of the chips 120 as the gaming chips in the chip tray 17 after end of collection of chips as losing gaming chips and redemption for chips as winning gaming chips after the game is over is assumed as Ba. In addition, in this game, the total value of the chips 120 as the gaming chips of all the play positions 7 bet in a player area is assumed as bp, the total value of the chips 120 as the gaming chips of all the play positions 7 bet in a bunker area is assumed as bb, and the total value of the chips 120 as the gaming chips of all the play positions 7 bet in a tie area is assumed as bt. For example, when the win or lose result of this game is win of the banker, it should be established that Ba−Bb=bp−bb+bt. Alternatively, the total value Ba of the chips 120 as the gaming chips in the chip tray 17 after end of the game should be (Bb+bp−bb+bt). If not, it is possible to determine that there is a fraud or mistake in the collection or redemption of the chip as the gaming chip.

As described above, the management control device 14 calculates the balance of the chips as the gaming chips from the value of the chips as the gaming chip bet on the game table 4 for each game and the win or lose result of the game, and verifies the increase in the balance of the chips as the gaming chips in the chip tray 17 after the game in the present embodiment. When the difference is detected in this verification, the management control device 14 issues an alarm or adds a record indicating the difference to a record of the video captured by the camera device 2. A casino operator can pursue a cause of the difference by confirming the video.

The measurement system according to the present embodiment adds or subtracts the increased or decreased value of the chips as the gaming chips in each game, calculated based on the positions, types, and number of the chips 120 as the gaming chips bet by all the players 6 in the game and the win or lose result of the game obtained by the win or lose result determination device to or from the total value of the chips 120 as the gaming chips in the chip tray 17 before the settlement of the game, compares the total value of the chips 120 as the gaming chips that needs to be present in the chip tray after the settlement when ending the game with the actual total value of the chips 120 as the gaming chips in the chip tray 17 when ending the game obtained using the image recording device 300, and determines whether or not there is a difference between the total value that needs to be present and the actual total value.

The management control device 14 grasps the positions, types and number of the chips as the gaming chips bet by the respective players via the image recording device 300, grasps the actual total value of the chips as the gaming chips in the chip tray at when the collection of all the chips as the losing gaming chips bet by the respective players has been completed, compares the total value of the chips 120 as the gaming chips that needs to be present in the chip tray 17, obtained by adding the increase of the chip tray 17 in each game to the total value of chips as the gaming chips in the chip tray before the settlement of the game based on the position, type, and number of the chips as the gaming chips bet by the losing player, with the actual total value of the chips 120 as the gaming chips in the chip tray 17, and determines whether or not there is a difference between the total value that needs to be present and the actual total value.

The management control device 14 compares the total value of the chips 120 as the gaming chips that needs to be present in the chip tray 17, obtained by adding the increase of the chip tray 17 in each game to the total value of the chips 120 as the gaming chips in the chip tray 17 before the settlement of the game based on the position, type, and number of the chips 120 as the gaming chips bet by the losing player, with the actual total value of the chips 120 as the gaming chips in the chip tray 17, determines whether or not there is a difference between the total value that needs to be present and the actual total value, compares the total value that needs to be present in the chip tray 17 after the settlement when ending the game with the actual total value of the chips 120 as the gaming chips in the chip tray 17 when ending the game obtained using the image recording device 300, determines that there is a mistake in payment when it is determined that there is a difference between the total value that needs to be present and the actual total value, and generates a payment error signal for notification of the mistake in payment.

The chip tray 17 is provided with the collection chip tray 171 to collect and temporarily store the chips 120 as the gaming chips bet by the losing player, and the image recording device 300 compares the total value of the chips 120 as the gaming chips that needs to be present in the collection chip tray 171 added with the increase of the chips 120 as the gaming chips in the game, calculated based on the position, type and number of the chips 120L as the gaming chips as bet by the losing player, with the actual total value of the chips 120 as the gaming chips in the collection chip tray 171, and determines whether or not there is a difference between the total value that needs to be present and the actual total value.

When the management control device 14 determines that there is a difference because the actual total value of the chips 120 as the gaming chips grasped on the chip tray 17 of the dealer 5 of the game table 4 does not correspond to the increased or decreased value of the chips as the gaming chips, calculated based on the value of chips as the gaming chips bet by all the players and the win or lose result of the game, the image recording device 300 can assign an index or time to the acquired video or specify and replay a collection scene or a payment scene of the chip 120 as the gaming chips such that a record of the game where the above-described difference has occurred can be analyzed by the image recording device 300.

In this manner, the management control device 14 obtains the total value of the chips as the gaming chips (chips) in the chip tray 17 after the settlement at the end of the game using the image recording device 300, and is assumed to perform the determination after the settlement in this case when any one of the following 1) to 4) occurs.
1) When the redemption for the chip (winning chip) 120 as the winning gaming chip has been completed;
2) When the cards 1 used in the game are collected and discarded in a discard area or a discard slot of the table;
3) When a predetermined button accompanying the win or lose result determination device is pushed; and
4) When a marker (not illustrated) indicating win or loss returns to the original state.

In the above-described measurement system, the management control device 14 performs imaging of the position, type and number of the chips as the gaming chip placed by the game participant in each game, and this imaging is performed when any one of the following 1) to 3) is detected.
1) When the card distributing device detects that a first card is drawn;
2) Before and after such draw; and
3) After the management control device recognizes a sign of dealer's betting end.

In addition, the management control device 14 has the artificial intelligence utilization type or the deep learning structure that can grasp a position (betting position among the player, the banker, and the pair) and the amount (the type and the number) of the chips as the gaming chips bet in the respective play positions 7 of the game table 4, compare win or lose history of each of the players 6 and the amount (winning amount) of the chips as the gaming chips, obtained using the win or lose result of each game, with statistical data of past multiple games (big data), and extract a unique situation (set by the casino). Typically, the management control device 14 having the artificial intelligence utilization type or the deep learning structure that is capable of extracting generation of a winning value exceeding a certain value (one million dollars) and the situation in which the state where the value of chips as gaming chips bet at the time of lose is small and the value of chips as gaming chips bet at the time of win that continues for several games in the play position 7 of the certain game table 4 as the unique situation when being compared with the statistical data of past games (big data and the like).

Further, the management control device 14 (integrated with the image recording device 300) of the present measurement system has the structure capable of extracting the unique situation or specifying the individual players 6 in the play position 7 who has won a predetermined value or more. For such specifying of the player 6, an image of a face is obtained by feature point extraction or the like using the image recording device 300, and the player 6 is specified by attaching an identity number (ID or the like). Further, the management control device 14 has a warning function of notifying the presence of the specified player in another game table when the specified player 6 leaves the original game table and arrives at the other game table. Specifically, a pit manager managing each of the game tables 4 and a person in charge of each table (which may be a dealer) are notified so as to prevent further unique phenomena.

Incidentally, win or lose history for each of the play positions 7 and the obtained value (winning value) of chips as gaming chips may be monitored without specifying the individual players 6 in the above-described example. In this case, it is difficult to track each of the players 6 when the player 6 leaves the seat, but it is possible to detect the unique situation such as a situation in which a state where the value of chips as gaming chips bet when losing at the specific play position 7 in the single game table 4 is small and the value of chips as gaming chips bet when winning is large continues for several games. Further, when the above-described play position 7 is detected, it is doubted that there is a fraud or mistake in the play position 7. Further, it is possible to discover the fraud or mistake by verifying the video capturing the play position 7.

Specifically, the camera device 2 is installed so as to capture at least the chip 120 as the gaming chip placed in the bet area 8 of the game table 4. The image recording device 300 analyzes the image captured by the camera device 2 and detects which position among the player, the banker and the tie in the bet area 8 at which the chips as the gaming chips are placed for each of the play positions 7 and the value of the placed chips as the gaming chips. In addition, the card distributing device 3 also functions as the win or lose result determination device and determines the win or lose result of the game. The management control device 14 records (monitors) the win or lose history for each of the play positions 7 and the value of chips as gaming chips (the value of earned chips as gaming chips) based on the position (the player, the banker, or the tie) in the bet area 8 where the chips 120 as the gaming chips are placed and the win or lose result of the game. Incidentally, only one of the win or lose history and the value of earned chips as gaming chips may be recorded. When the win or lose history and/or history of the value of earned chips as gaming chips shows a unique situation (set by the casino) when being compared with the statistical data of the past multiple games (big data), the management control device 14 specifies this play position 7 as a play position suspected of a fraudulent behavior.

When a certain play position 7 is suspected of the fraudulent behavior, a fraud detection system may generate an alarm (light, sound, or vibration) such that at least the dealer can perceive the fraud at this point in time. Accordingly, it is possible to prevent the continuation of the fraudulent behavior by at least suspending the subsequent games on the spot. In addition, information indicating that the fraudulent behavior has been suspected may be added to the video captured and recorded by the camera device 2. Accordingly, it is possible to investigate a cause of suspicion of the fraudulent behavior by confirming the video.

As described above, the chip 120 as the gaming chip according to the present embodiment has the laminated structure including the plurality of plastic layers in which the colored layer 121 and the white layers 122 or the light color layers sandwiching the colored layer 121 are laminated, and accordingly, the stripe pattern is formed in the laminated direction on the side face. The chip 120 as the gaming chip has the configuration in which the type of the chip 120 as the gaming chip can be specified by the colored layer 121 appearing on the side face. In addition, the printing is applied to the upper and lower surfaces of the chip 120 as the gaming chip. Specifically, the printing is applied to the surface of the white layer 122 or the light color layer, and the transparent layer 124 is provided on the top surface thereof. The colored layer 121, the white layer 122 or the light color layer, and the printed layer 124 have the layered structure obtained by thermocompression bonding between the respective layers.

The white layers 122 or the light color layers sandwiching the colored layer 121 may be configured to have the different thicknesses between the upper and lower layers. In addition, the outer edges of the upper and lower surfaces of the chip 120 as the gaming chip are subjected to the R processing in the present embodiment. Accordingly, it is possible to prevent the damage of the hand of the player handling the chip 120 as the gaming chip or the damage of the chip 120 as another gaming chip. In addition, the RFID 125 is brought into close contact and fixed between the plastic layers forming any of the colored layer 121, the white layer 122 or the light color layers in the present embodiment.

In addition, the face code using a UV light-emitting ink or an infrared absorbing ink such as an ink absorbing an infrared ray (carbon black ink) is provided on the upper surface and/or the lower surface of the chip 120 as the gaming chip in the present embodiment. In addition, as a modified example of the present embodiment, any one of the security mark and the optical variable device (OVD), or the both may be printed on the surface of the chip 120 as the gaming chip instead of the face code or together with the face code.

The management control device 14 according to the present embodiment performs the imaging for determination of the position, type, and number of chips as gaming chips placed by the game participant in each game when the first card is drawn from the card distributing device 3, before or after such draw, or after the sign of dealer's betting end.

In addition, the measurement system according to the present embodiment includes the card distributing device 3 which determines and displays the win or lose result of each game on the game table 4, the camera device 2 which images the chip 120 as the gaming chip placed on the game table 4, and the management control device 14 which specifies and stores the position, type, and number of chips as gaming chips placed on the game table 4 by the game participant 6 using the imaging result of the camera device 2. The chip 120 as the gaming chip is the laminated structural body in which the colored layer 121 and the white layer 122 or the light color layer are laminated, and has the stripe pattern in the laminating direction on the side face. The management control device 14 has the calculation function of performing the balance calculation on the casino side in the game table 4 for each game based on the win or lose result obtained from the card distributing device 3 and the position, type, and number of the chips 120 as the gaming chips specified using the imaging result of the camera device 2.

The management control device 14 has the function of measuring the number of the colored layers 121, or the white layers 122 or the light color layers of the chips 120 as the gaming chips placed by each of the game participants 6 and determining the type and value of chips as the gaming chips according to the color of the colored layer 121 to determine the number of the chips 120 as the gaming chips.

As described above, the chips 120 as the gaming chips are not only stacked to be aligned in the vertical direction but also stacked to be shifted from each other as illustrated in FIG. 2. In this case, when the camera device 2 is positioned in the arrow X direction illustrated in FIG. 2 (or when the orientation of the chip 120 as the gaming chip becomes relatively the blind spot), it is assumed that the chip 120 as the gaming chip is invisible (enters the blind spot). The information on the players at the respective play positions 7 and on which number and which type of the chips 120 as the gaming chips are bet at which position (the player, the banker, or the pair) in the bet area 8 is obtained by capturing the image of the chips 120 as the gaming chips placed in the bet area 8 using the camera device 2 and analyzing the image for each of the play positions 7 using the image recording device 300. However, an extremely sophisticated and expensive image analysis device is required due to the problem such as the blind spot if such imaging is performed only using the camera device 2. The present embodiment has a special configuration in order to solve this problem. Details will be described below.

Figure 10:
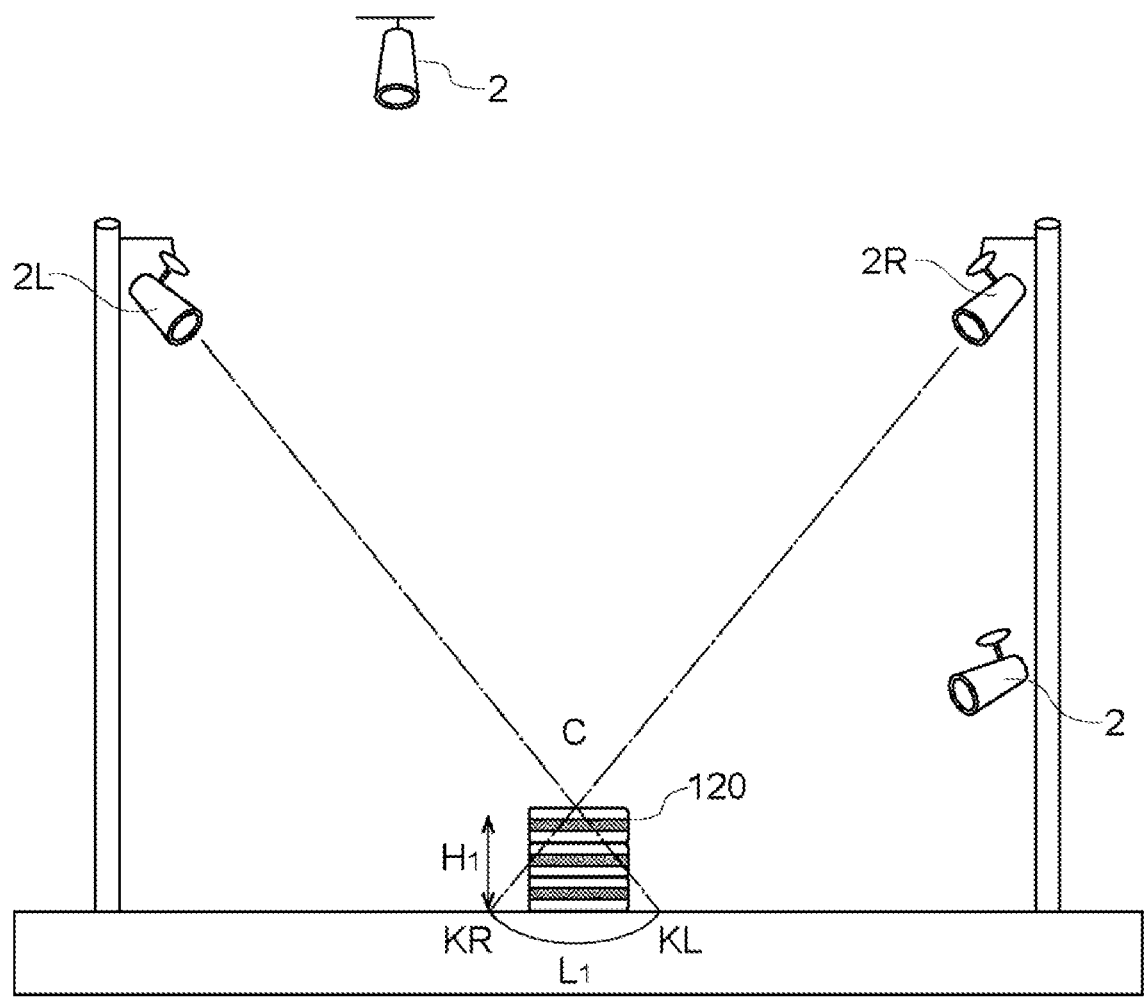
FIG. 10 is a view illustrating a method of measuring the number of chips as gaming chips according to the first embodiment of the present invention.
Figure 11:
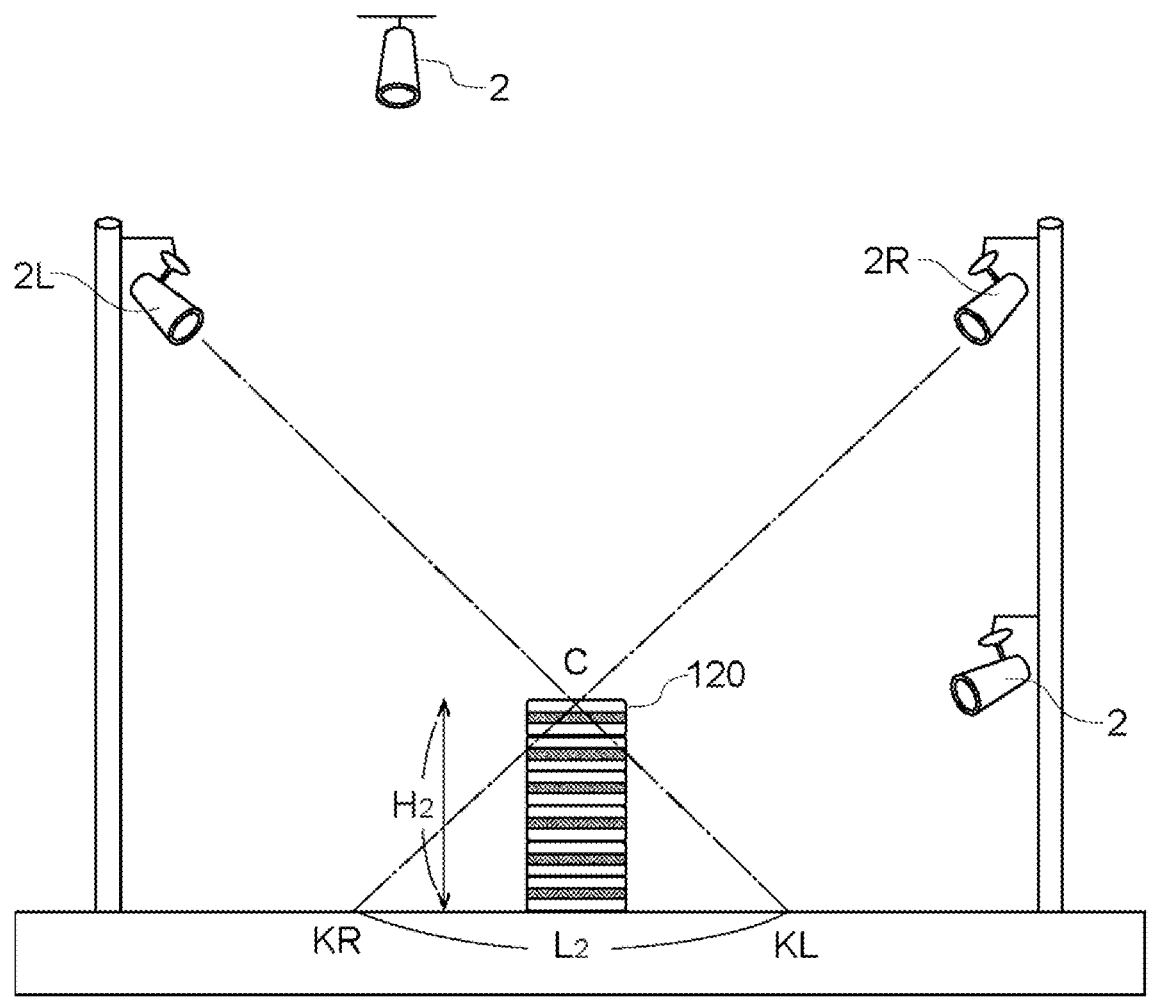
FIG. 11 is a view illustrating the method of measuring the number of the chips as the gaming chips according to the first embodiment of the present invention.

In FIGS. 10 and 11, the measurement system according to the present embodiment further includes height measurement cameras 2R and 2L, which are arranged at predetermined height positions from the game table 4 and capture the chip 120 as the gaming chip from different positions or angles, in addition to the camera device 2 which captures the chip 120 as the gaming chip. Hereinafter, it is assumed that the height measurement cameras 2R and 2L and the chip 120 as the gaming chip are placed on the same plane perpendicular to the game table 4. A relational expression among an angle α formed between the game table 4 and a straight line connecting the height measurement camera 2R and a center C of the chip 120 as the uppermost gaming chip, an angle β formed between the game table 4 and a straight line connecting the height measurement camera 2L and the center C of the uppermost gaming chip 120, a distance L between an intersection point KR between the game table 4 and the straight line connecting the height measurement camera 2R and the center C of the uppermost gaming chip 120 and an intersection point KL between the game table 4 and the straight line connecting the height measurement camera 2L and the center C of the uppermost gaming chip 120, and a height H of the chips 120 as the overlapping gaming chips is expressed by the following Formula.

$$L = \frac{H}{\tan\alpha} + \frac{H}{\tan\beta} \qquad \text{Formula (1)}$$

Here, the distance L, and the angles α and β are obtained by the following method. The intersection points KR and KL are positions obtained by projecting the center C of the chip 120 as the uppermost gaming chip onto the game table 4 from the angle of view of the height measurement cameras 2R and 2L. Accordingly, the intersection points KR and KL are obtained by obtaining a center of a contour of the chip 120 as the uppermost gaming chip in images captured by the height measurement cameras 2R and 2L through image processing. Further, the distance L (L1 or L2 illustrated in FIG. 10 or 11) between the intersection points KR and KL is obtained by obtaining an image obtained by looking down the game table 4 from directly above through image processing on the images captured by the height measurement cameras 2R and 2L. Further, it is possible to obtain the angles α and β if the positions of the intersection points KR and KL are understood since the height of the height measurement cameras 2R and 2L from the table is constant. As above, the height H of the chips 120 as the overlapping gaming chips can be obtained by Formula (2) obtained by modifying Formula (1) using the distance L and the angles α and β obtained as described above.

$$H = \frac{\tan\alpha \times \tan\beta}{(\tan\alpha + \tan\beta)} L \qquad \text{Formula (2)}$$

Figure 12:
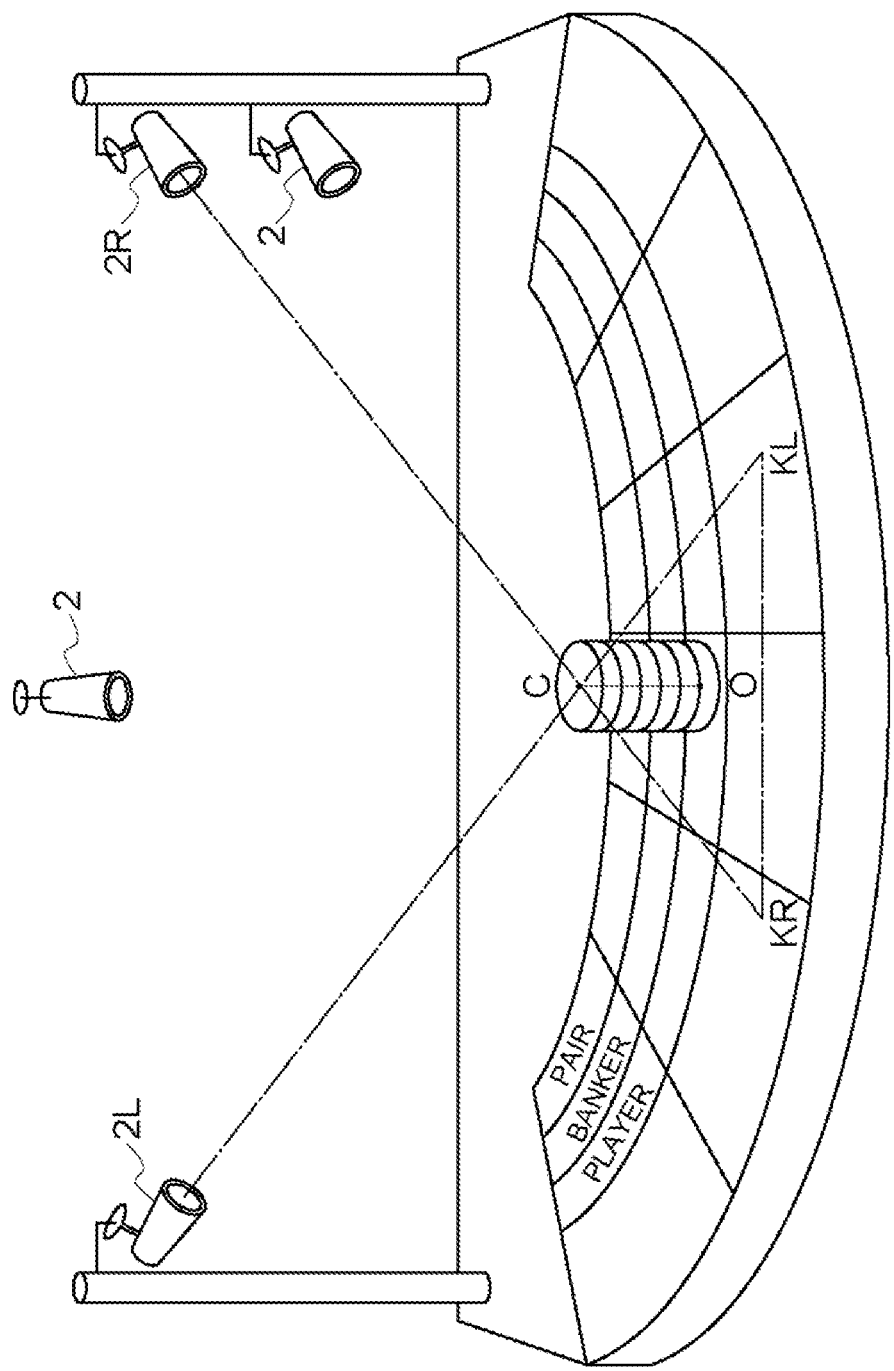
FIG. 12 is a view illustrating the method of measuring the number of the chips as the gaming chips according to the first embodiment of the present invention.

Although it is assumed that the height measurement cameras 2R and 2L and the chip 120 as the gaming chip are present on the same plane perpendicular to the game table 4 in order for simplicity of description hereinabove, it is possible to perform the calculation in the same manner in FIG. 12 even when the height measurement cameras 2R and 2L and the chip 120 as the gaming chip are not present on the same plane perpendicular to the game table 4. When an intersection point between a table surface and a perpendicular line from the center C to the table surface is O, an angle formed between a straight line connecting the intersection points O and KR and a straight line connecting the intersection points KR and KL is γ, and an angle formed between a straight line connecting the intersection points O and KL and the straight line connecting intersection points KR and KL is δ, the calculation can be expressed by Formula (2)' although the details thereof is omitted.

$$H = \frac{\tan\alpha \tan\beta}{\tan\alpha \cos\delta + \tan\beta \cos\gamma} L \qquad \text{Formula (2)'}$$

The number of chips 120 as the gaming chips having a predetermined thickness t can be obtained by H/t by obtaining the height H of the chips 120 as the overlapping gaming chips using the above-described method. The image recording device 300 can more easily and correctly obtain types of chips and the number of chips for each type using the information on the number of the chips 120 as the gaming chips, and the chip total value measuring device 302 obtains the total value of the chips 120 as the gaming chips. As illustrated in FIGS. 10 and 11, L1 and L2 and angles α and β are changed in accordance with heights H1 and H2, and thus, the respective heights H1 and H2 are obtained by Formula (2) for the chips 120 as the gaming chips at the same position. In addition, the height measurement cameras 2R and 2L may also have the function of the camera device 2 to capture the chip 120 as the gaming chip.

Figure 13:
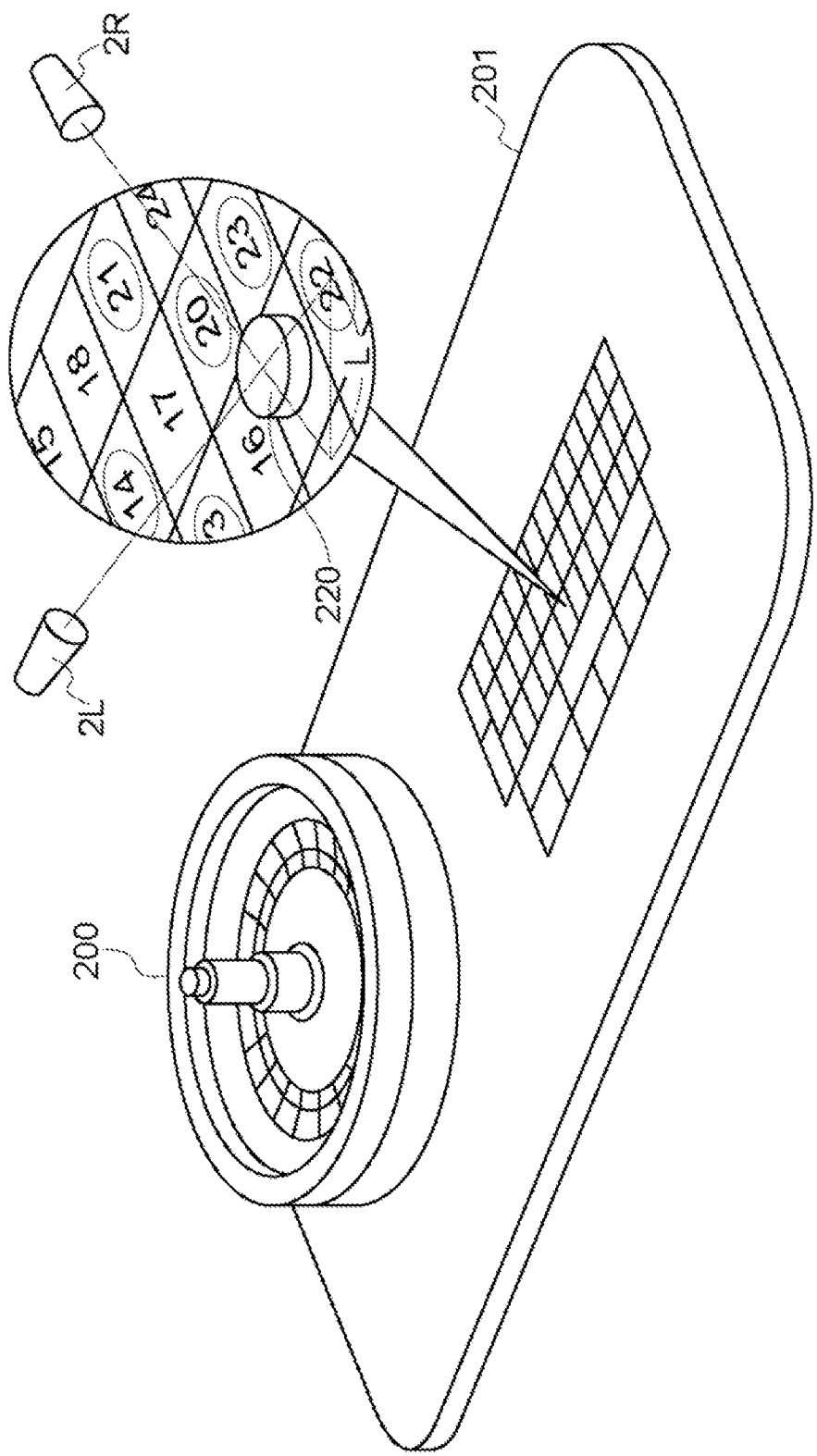
FIG. 13 is a view illustrating a method of measuring the number of chips as gaming chips according to another embodiment of the present invention.

FIG. 13 is a view of the measurement system according to the present embodiment in roulette. Chips 220 as gaming chips are stacked and placed on a game table 201. Even in this case, it is possible to obtain the distance L between the intersection point KR between the game table 201 and the straight line connecting the height measurement camera 2R and the center C of an uppermost gaming chip 220 and the intersection point KL between the game table 201 and the straight line connecting the height measurement camera 2L and the center C of the uppermost gaming chip 220 using the height measurement cameras 2R and 2L, and to obtain the height H of the chips 220 as the gaming chips using the above-described method. The number of the chips 220 as the gaming chips is obtained based on the height H and the thickness t of the chip 220 as the gaming chip. In the roulette, the chips 220 as one type of gaming chips whose color is different for each player are used. Therefore, it is possible to obtain the total value of the chips 220 as the gaming chips based on only the number of the chips 220 as the gaming chips obtained by the height measurement cameras 2R and 2L and a chip number measuring device 301, and to distinguish the player 6 who has bet based on the color of the chip 220 as the uppermost gaming chip.

Incidentally, the management control device 14 or the like may have the artificial intelligence utilization type or the deep learning structure in the measurement system according to the present embodiment, and devices having an artificial intelligence utilization type or the deep learning structure are disclosed in U.S. Pat. No. 9,361,577, US 2016-171336 A, US 2015-036920 A, JP 2016-110232 A, and these disclosures are incorporated into this specification by reference.

Although the various embodiments of the present invention have been described as above, it is a matter of course that the above-described embodiments can be modified by those skilled in the art within a scope of the present invention, and the device according to the embodiment may be appropriately modified if needed in a game to which the embodiment is applied.

What is claimed is:

1. A chip measurement system for chips on a game table in a game hall, the chip measurement system comprising:
   a plurality of height measurement cameras that each obtains, from different positions or angles than one another, a respective image of chips stacked as a chip stack during a game played on the game table; and
   a management control device, wherein:
      the management control device is configured to, based on a combination of the images, obtain (a) a height of the chip stack and (b) a number of the chips in the chip stack; and
      the obtainment of the height of the chip stack based on the combination of the images includes:
         for each of the respective images:
            applying image recognition to the respective image to identify a respective representation of the chips in the respective image;
            determining a specific point in the identified respective representation of the chips in the respective image, the specific point being a same specific point of a same specific one of the chips that is identified in all of the respective images; and
            determining information regarding the specific point with respect to a viewing direction from a perspective of the respective height measurement camera by which the respective image was obtained; and
         obtaining the height of the chip stack based on a combination of the information regarding the specific point in the respective viewing directions determined for all of the images obtained by the plurality of height measurement cameras.

2. The chip measurement system according to claim 1, wherein the management control device includes or controls a chip total value measuring device that calculates and obtains a total value of the stacked chips from the obtained number of the chips.

3. The chip measurement system according to claim 1, wherein the management control device includes or controls a chip total value measuring device that calculates and obtains a total value of the stacked chips based on the obtained number of the chips and a type of each of the chips identified from an image analysis of the obtained images.

4. The chip measurement system according to claim 1, wherein the management control device has a configuration capable of determining respective positions, types, and numbers of chips respectively bet by each of a plurality of players based on the obtained images and grasping respective total values of all the chips respectively bet by each of the players.

5. The chip measurement system according to claim 1, further comprising:
   a chip tray camera that obtains an image of a chip tray of a dealer of the game table; and
   a chip measuring device that grasps a total value of chips in the chip tray from the image obtained by the chip tray camera.

6. The chip measurement system according to claim 1, further comprising:
   a win or lose result determination device that obtains a win or lose result of each game on the game table, wherein the management control device has a configuration capable of grasping a total value of chips bet by a losing player in the game from a position, a type and a number of the chips bet by the losing player based on information obtained by the win or lose result determination device.

7. The chip measurement system according to any claim 1, wherein the management control device grasps a total value of chips to be measured in a chip tray of a dealer of the game table, adds or subtracts an increased or decreased value of chips to be measured in the game, calculated based on positions, types, and numbers of chips to be measured bet by all of a plurality of players in the game and a win or lose result of the game obtained by a win or lose result determination device, to or from the total value of the chips to be measured in the chip tray as a measurement target before settlement of the game, compares a total value of chips to be measured that needs to be present in the chip tray as the measurement target after settlement when ending the game with an actual total value of chips to be measured in the chip tray as the measurement target when ending the game obtained using images from the cameras, and determines whether or not there is a difference between the total value that needs to be present and the actual total value.

8. The chip measurement system according to claim 1, wherein the management control device includes or controls a chip total value measuring device that calculates a total value of the stacked chips using the images, which are taken from the different positions or angles of the respective cameras.

9. The chip measurement system according to claim 1, wherein:
   each of one or more of the chips of the chip stack includes a laminated structural body including a plurality of plastic layers;
   the plurality of plastic layers includes at least a colored layer and a white or light color layer with a stripe pattern, in a laminating direction, on a side face so as to enable a type of a gaming chip to be specified by the colored layer;
   the laminated structural body includes, on upper and lower faces thereof, printed layers indicating a type of the chip; and
   the layers of the laminated structural body are laminated and thermocompression bonded together.

10. The chip measurement system according to claim 1, wherein:
    the management control device is configured to obtain a total value of the stacked chips based on the obtained number of the chips and an image analysis of the obtained images by which layer information of a laminated structural body of respective ones of the chips of the chip stack is identified;
    the laminated structural body includes a plurality of plastic layers;
    the plurality of plastic layers include at least a colored layer and a white or light color layer laminated on each other, thereby forming a stripe pattern of stripes that extend horizontally on a side face so as to enable a type of a gaming chip to be specified by the colored layer;
    the side face is between upper and lower faces of the laminated structural body at which upper and lower faces there are respective printed layers indicating a type of the chip; and
    the layers of the laminated structural body are thermocompression bonded together.

11. The chip measurement system according to claim 10, wherein at least one of the plurality of plastics layers is a heavy layer containing metal powder for weight increase in the layer.

12. The chip measurement system according to claim 10, wherein the white or light color layer is provided with different respective thicknesses on both sides of the colored layer, thereby sandwiching the colored layer.

13. The chip measurement system according to claim 1, wherein the specific point is a point of a top one of the chips in the representation of the chip stack within the respective image.

14. The chip measurement system according to claim 1, wherein each of the specific point is a center of a top one of the chips in the representation of the chip stack within the respective image.

15. The chip measurement system according to claim 14, wherein the management control device is configured to perform the obtainment of the height by determining, for each of the height measurement cameras:
an angle formed between (a) a line that extends from the respective height measurement camera through the center of the representation of the top one of the chips of the chip stack in the respective image to a top surface of the game table and (b) the top surface of the game table; and
a position at which the line meets the top surface of the game table.

16. The chip measurement system according to claim 1, wherein the plurality of height measurement cameras are positioned such that the respective directions of the plurality of height measurement cameras to their respective focal points are substantially oblique relative to the game table and relative to the stack direction of the chip stack stacked on the table.

17. The chip management system according to claim 1, wherein the management control device includes or controls an image recording device for recording states of the chips using the images obtained by the plurality of height measurement cameras and includes or controls a chip number measuring device for the obtaining of the height of the chip stack and the number of chips in the chip stack.

18. The chip measurement system according to claim 14, wherein the center is a radial center of the top one of the chips in the representation of the chip stack within the respective image.

19. The chip measurement system according to claim 1, wherein the obtainment of the height of the chip stack is performed by identifying, for each of the respective images, a respective relationship between the specific point determined for the respective image and a top surface of the game table on which the chips are stacked.

20. The chip measurement system according to claim 19, wherein the respective relationship includes:
an angle between (a) the top surface of the game table and (b) a respective viewing line of the respective height measurement camera that extends from the respective height measurement camera from which the respective image was obtained, through the specific point, to the top surface of the game table; and
an intersect position at which the viewing line intersects the top surface of the game table.

21. The chip measurement system according to claim 20, wherein the respective relationship further includes an angle between (a) a line that extends, in a direction perpendicular to the top surface of the game table, from the specific point to the top surface of the game table and (b) a line that extends from the intersect position to an intersect position at which the respective viewing line of another of the height measurement cameras intersects the top surface of the game table.

22. The chip measurement system according to claim 21, wherein:
the management control device is configured to determine the height by determining a value of $$\frac{(L)(\tan\alpha)(\tan\beta)}{((\tan\alpha)(\cos\delta)) + ((\tan\beta)(\cos\gamma))};$$

α is the angle between (a) the top surface of the game table and (b) the respective viewing line of a first one of the respective height measurement cameras;

β is the angle between (a) the top surface of the game table and (b) the respective viewing line of a second one of the respective height measurement cameras;

γ is the angle between (a) the line that extends, in the direction perpendicular to the top surface of the game table, from the respective specific point of the image of the first height measurement camera to the top surface of the game table and (b) the line that extends from the intersect position at which the respective viewing line of the first height measurement camera intersects the top surface of the game table to the intersect position at which the respective viewing line of the second height measurement camera intersects the top surface of the game table;

δ the angle between (a) the line that extends, in the direction perpendicular to the top surface of the game table, from the respective specific point of the image of the second height measurement camera to the top surface of the game table and (b) the line that extends from the intersect position at which the respective viewing line of the second height measurement camera intersects the top surface of the game table to the intersect position at which the respective viewing line of the first height measurement camera intersects the top surface of the game table; and L is a distance between the intersect positions.

* * * * *

UNITED STATES PATENT AND TRADEMARK OFFICE
CERTIFICATE OF CORRECTION

PATENT NO. : 10,957,156 B2
APPLICATION NO. : 15/700942
DATED : March 23, 2021
INVENTOR(S) : Shigeta Page 1 of 1

It is certified that error appears in the above-identified patent and that said Letters Patent is hereby corrected as shown below:

In the Claims

Claim 22, Column 22, Line 44, please insert --is-- after the term "$\delta$"

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*